US011342821B2

(12) United States Patent
Ushida et al.

(10) Patent No.: US 11,342,821 B2
(45) Date of Patent: May 24, 2022

(54) METHOD FOR MANUFACTURING A ROTOR

(71) Applicant: AISIN CORPORATION, Kariya (JP)

(72) Inventors: Hideharu Ushida, Anjo (JP); Tetsuya Matsubara, Anjo (JP); Tetsuya Takahashi, Anjo (JP)

(73) Assignee: AISIN CORPORATION, Kariya (JP)

( * ) Notice: Subject to any disclaimer, the term of this patent is extended or adjusted under 35 U.S.C. 154(b) by 734 days.

(21) Appl. No.: 16/310,582

(22) PCT Filed: Sep. 1, 2017

(86) PCT No.: PCT/JP2017/031521
§ 371 (c)(1),
(2) Date: Dec. 17, 2018

(87) PCT Pub. No.: WO2018/047727
PCT Pub. Date: Mar. 15, 2018

(65) Prior Publication Data
US 2019/0252958 A1    Aug. 15, 2019

(30) Foreign Application Priority Data

Sep. 7, 2016    (JP) .............................. JP2016-174214

(51) Int. Cl.
*H02K 15/03*    (2006.01)
*H02K 1/276*    (2022.01)
*H02K 15/12*    (2006.01)

(52) U.S. Cl.
CPC ............. *H02K 15/03* (2013.01); *H02K 1/276* (2013.01); *H02K 1/2766* (2013.01); *H02K 15/12* (2013.01); *Y10T 29/49012* (2015.01)

(58) Field of Classification Search
CPC ........ H02K 15/03; H02K 15/12; H02K 1/276; H02K 1/2766; Y10T 29/49012
See application file for complete search history.

(56) References Cited

U.S. PATENT DOCUMENTS

2013/0119812 A1* 5/2013 Takizawa ............... H02K 1/276
310/156.53

FOREIGN PATENT DOCUMENTS

| JP | 2006238531 A | * | 9/2006 | ............. H02K 1/276 |
|---|---|---|---|---|
| JP | 2007-151362 A | | 6/2007 | |
| JP | 2012-80716 A | | 4/2012 | |
| JP | 5609330 B2 | * | 10/2014 | |
| JP | 2015-35888 A | | 2/2015 | |
| JP | 2016-127771 A | | 7/2016 | |

OTHER PUBLICATIONS

Nov. 21, 2017 International Search Report issued in International Patent Application No. PCT/JP2017/031521.

* cited by examiner

*Primary Examiner* — A. Dexter Tugbang
(74) *Attorney, Agent, or Firm* — Oliff PLC

(57) ABSTRACT

In a method for manufacturing a rotor, each of adhesive placement portions that are provided between a surface of a permanent magnet on the radially inner side and grooves is formed so as to cover a part of an adhesive applied to the permanent magnet on the radially inner side and parts of the adhesive on both sides in the circumferential direction.

20 Claims, 10 Drawing Sheets

METHOD FOR MANUFACTURING A ROTOR

BACKGROUND

The present disclosure relates to methods for manufacturing a rotor.

Methods for manufacturing a rotor which include the step of inserting permanent magnets into magnet holes of a rotor core are conventionally known in the art. Such methods for manufacturing a rotor are disclosed in, e.g., Japanese Patent Application Publication Nos. 2016-127771 (JP 2016-127771 A) and 2007-151362 (JP 2007-151362 A).

JP 2016-127771 A discloses a rotor having magnet holes in which permanent magnets are inserted. The magnet hole includes a magnet pocket portion in which a permanent magnet is placed and a groove which is continuous with the magnet pocket portion and in which a sheet-like foaming agent is placed. Both the magnet pocket portion and the groove are formed so as to extend in the direction of the rotation axis.

After the sheet-like foaming agent is placed in the groove of the magnet hole, the permanent magnet is inserted into the magnet pocket portion. The area of the magnet pocket portion is larger than that of the permanent magnet as viewed in the direction of the rotation axis. The area of the groove is larger than that of the sheet-like foaming agent as viewed in the direction of the rotation axis. That is, with the permanent magnet placed in the magnet pocket portion, there is clearance between the magnet pocket portion and the permanent magnet as viewed in the direction of the rotation axis. With the sheet-like foaming agent placed in the groove, there is clearance between the groove and the sheet-like foaming agent. The rotor (rotor core) is heated with both the sheet-like foaming agent and the permanent magnet placed in each magnet hole. The sheet-like foaming agent thus expands, whereby the clearance between the magnet hole and the permanent magnet is filled with the sheet-like foaming agent. The permanent magnets are thus fixed to the rotor core.

In Japanese Patent Application Publication No. 2016-127771 (JP 2016-127771 A), an adhesive need be placed in the magnet holes, and it may possibly be troublesome to place an adhesive in the magnet holes. A technique as described in Japanese Patent Application Publication No. 2007-151362 (JP 2007-151362 A) is also known as a technique that addresses this concern. In Japanese Patent Application Publication No. 2007-151362 (JP 2007-151362 A), an adhesive is placed in advance on the permanent magnets and formed into a sheet, and the resultant permanent magnets are inserted into magnet holes of a rotor core. The adhesive is then heated to foam, whereby the permanent magnets are fixed to the magnet holes. In this case, in order to facilitate insertion of the permanent magnet (to restrain contact between the permanent magnet and the magnet hole), the size of the magnet hole is determined so that there is clearance between each side surface of the permanent magnet which has the adhesive placed thereon and the sidewall of the magnet hole which faces this side surface.

SUMMARY

In the method for manufacturing a rotor as described in Japanese Patent Application Publication No. 2007-151362 (JP 2007-151362 A), the size of the magnet hole is determined so that there is clearance between the permanent magnet and the magnet hole. However, the adhesive placed in advance on the permanent magnet may contact the magnet hole (the edge of the magnet hole, the inner side surface of the magnet hole, etc.) due to wobbling of the permanent magnet (radial displacement of the rotor etc.) when the permanent magnet is inserted into the magnet hole. In this case, the adhesive may be peeled off from the permanent magnet.

An exemplary aspect of the disclosure provides a method for manufacturing a rotor which can restrain an adhesive from being peeling off by contact between the adhesive and a magnet hole.

A method for manufacturing a rotor according to an aspect of the present disclosure is a method for manufacturing a rotor including a rotor core and a permanent magnet, the rotor core having a magnet hole that extends in a direction of a rotation axis of the rotor and having a protrusion that is formed on an inner side surface of the magnet hole on one of a radially outer side and a radially inner side so as to protrude toward the other of the radially outer side and the radially inner side, and the permanent magnet being inserted in the magnet hole and fixed to the rotor core with an adhesive, including the steps of: applying the adhesive, which contains an expanding agent that expands when heated to a temperature equal to or higher than an expansion temperature, so that the adhesive is placed on one of a radially outer side and a radially inner side of the permanent magnet, and is placed on one side of the protrusion in a circumferential direction of the rotor core as viewed in the direction of the rotation axis of the rotor; inserting the permanent magnet having the adhesive applied thereto into the magnet hole of the rotor core; and bonding the permanent magnet and the rotor core with the adhesive by expanding the expanding agent by heating the adhesive to a temperature equal to or higher than the expansion temperature after inserting the permanent magnet having the adhesive applied thereto into the magnet hole. In a state where a surface of the permanent magnet on one of the radially outer side and the radially inner side is in contact with the protrusion on the assumption that the permanent magnet has been inserted in the magnet hole and before the expanding agent of the adhesive is expanded, an adhesive placement portion, in which the adhesive is placed and which, as viewed in the direction of the rotation axis of the rotor, is provided between the surface of the permanent magnet on one of the radially outer side and the radially inner side and a groove formed next to the protruding portion in the circumferential direction and recessed toward one of the radially outer side and the radially inner side, covers a part of the adhesive applied to the permanent magnet on one of the radially outer side and the radially inner side and parts of the adhesive on both sides in the circumferential direction. The "permanent magnet" refers to a concept including a magnetized permanent magnet and an unmagnetized permanent magnet.

In the method for manufacturing a rotor according to the above aspect of the present disclosure, as described above, in the state where the surface of the permanent magnet on one of the radially outer side and the radially inner side is in contact with the protrusion on the assumption that the permanent magnet has been inserted in the magnet hole and before the expanding agent of the adhesive is expanded, the adhesive placement portion, in which the adhesive is placed and which is provided between the surface of the permanent magnet on one of the radially outer side and the radially inner side and the groove as viewed in the direction of the rotation axis of the rotor, covers the part of the adhesive applied to the permanent magnet on one of the radially outer side and the radially inner side and the parts on both sides of the adhesive in the circumferential direction. The adhesive placement portion (clearance) is thus formed so as to cover the part of the adhesive on one of the radially outer side and the radially inner side. Accordingly, even if the permanent magnet moves (wobbles) in the radial direction when inserted into the magnet hole, the adhesive can be restrained from contacting the magnet hole. Moreover, the adhesive placement portion (clearance) is formed so as to cover the parts of the adhesive on both sides in the circumferential direction. Accordingly, even if the permanent magnet moves (wobbles) in the circumferential direction when inserted into the magnet hole, the adhesive can be restrained from contacting the magnet hole. As a result, the adhesive can be restrained from being peeled off due to contact between the adhesive and the magnet hole. That is, the amount of adhesive required to bond the permanent magnet can be secured (maintained), whereby the permanent magnet can be firmly fixed.

Since contact between the adhesive and the magnet hole is restrained (that is, the permanent magnet contacts the magnet hole before the adhesive contacts the magnet hole), it is not necessary to adjust the attitude of the permanent magnet (position in the circumferential direction) so as to avoid contact of the adhesive with the magnet hole when the permanent magnet is inserted into the magnet hole. That is, the permanent magnet can be easily inserted into the magnet hole.

The present disclosure restrains an adhesive from being peeled off due to contact between the adhesive and a magnet hole.

DETAILED DESCRIPTION OF EMBODIMENTS

An embodiment of the present disclosure will be described below with reference to the accompanying drawings.

Structure of Embodiment

The structure of a rotor 100 according to the present embodiment will be described with reference to FIGS. 1 to 11.

In this specification, the "rotating electrical machine" refers to a concept including all of a motor (electric motor), a generator (electric generator), and a motor-generator that functions as either a motor or a generator as necessary. For example, a rotating electrical machine 101 is configured as a traction motor that is used in hybrid vehicles or electric vehicles.

Figure 1:
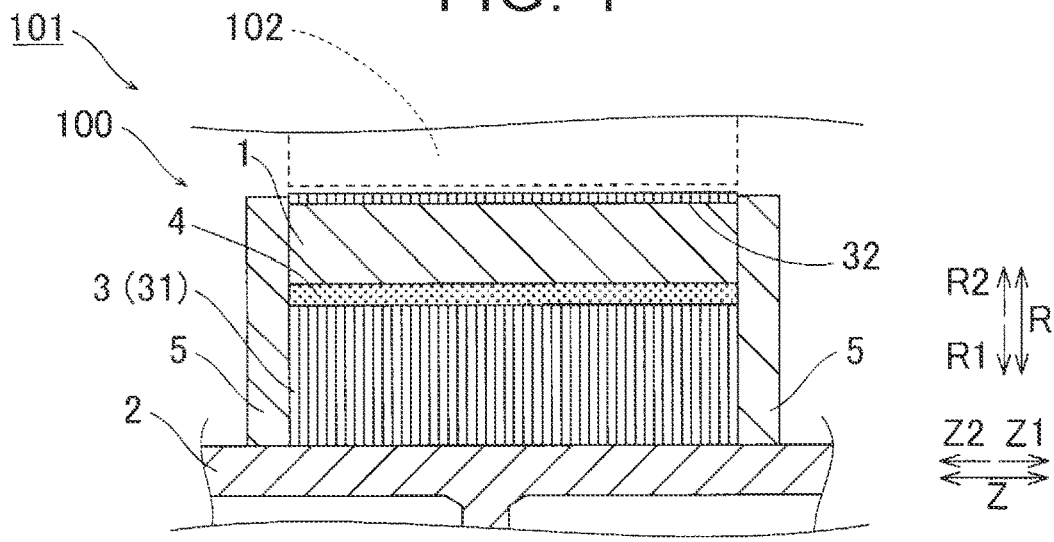
FIG. 1 is a sectional view of a rotating electrical machine (rotor) according to an embodiment of the present disclosure.

In this specification, the "direction of the rotation axis of the rotor" and the "axial direction" means the direction of the rotation axis of the rotor 100 (the direction along an axis C1 (see FIG. 2); the direction parallel to the Z-axis in FIG. 1). The "circumferential direction" means the circumferential direction of the rotor 100 (the direction of arrow A1 or the direction of arrow A2 in FIG. 2). The "radial direction" means the radial direction of the rotor 100 (the direction of arrow R1 or the direction of arrow R2 in FIG. 1). The "radially inner side" means the radially inner side (the side in the direction of arrow R1) of the rotor 100, and the expression "radially outer side" means the radially outer side (the side in the direction of arrow R2) of the rotor 100.

(General Structure of Rotor)

As shown in FIG. 1, the rotor 100 forms, e.g., a part of an interior permanent magnet motor (IPM motor) having a plurality of permanent magnets 1 embedded in the rotor 100 (a part of the rotating electrical machine 101).

The rotor 100 is placed radially inside a stator 102 so as to face the stator 102 in the radial direction. That is, the rotating electrical machine 101 is configured as an inner rotor-type rotating electrical machine. In the rotating electrical machine 101, the stator 102 has coils (not shown) mounted therein, so that the rotor 100 makes a rotational movement due to the interaction between the magnetic field (magnetic flux) generated by the coils and the magnetic field (magnetic flux) generated by the rotor 100 facing the stator 102. As shown in FIG. 1, the rotor 100 includes the permanent magnets 1, a hub member 2, a rotor core 3, an adhesive 4, and end plates 5. The rotor 100 is fixed to the hub member 2 connected to a shaft and transmits (or receives) the rotational movement to (from) the outside of the rotating electrical machine 101 via the hub member 2 and the shaft. The stator 102 is fixed to a case, not shown, of the rotating electrical machine 101.

The permanent magnets 1 are comprised of, e.g., neodymium magnets. Neodymium magnets have a positive coefficient of thermal expansion in the direction of magnetization (the direction of arrow R1 and the direction of arrow R2) and have a negative coefficient of thermal expansion in the direction perpendicular to the direction of magnetization (the lateral direction of the permanent magnet 1 and the direction along the Z-axis). The "lateral direction of the permanent magnet 1" refers to the direction perpendicular to the Z-axis and perpendicular to the direction of magnetization.

Figure 3:
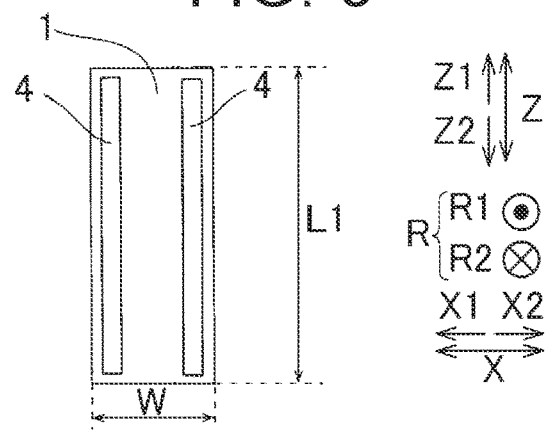
FIG. 3 is a side view showing the configuration of a permanent magnet and an adhesive for the rotor according to the embodiment of the present disclosure.
Figure 4:
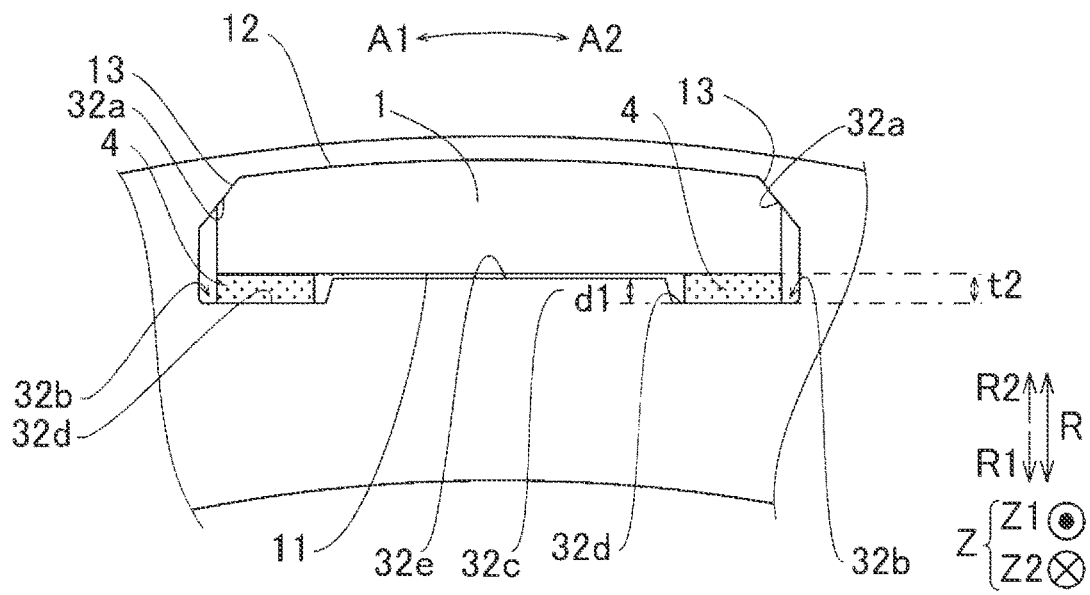
FIG. 4 is a partial plan view showing the state where the permanent magnet for the rotor has been bonded to a rotor core with the adhesive according to the embodiment of the present disclosure.

As shown in FIG. 3, the permanent magnet 1 has a substantially rectangular shape having an axial length L1 and a width W smaller than the length L1, as viewed from the radially inner side. As shown in FIG. 4, the permanent magnet 1 has a substantially rectangular shape having two chamfered corners on the radially outer side, as viewed from one side in the axial direction (as viewed from the side in the direction of arrow Z1). The permanent magnet 1 is configured so that its surface 11 on the radially inner side is a flat surface and its surface 12 on the radially outer side is an arc-shaped surface, as viewed from the one side in the axial direction.

Each of the two chamfered corners of the permanent magnet 1 has a surface 13 serving as a contact surface that contacts a magnet hole 32 described below. The surfaces 13 are tilted so as to conform to a pair of wall surfaces 32a of the magnet hole 32 described below. Specifically, the pair of surfaces 13 are tiled so as to be away from each other as they extend from the radially outer side (the side in the direction of arrow R2) and to the radially inner side (the side in the direction of arrow R1), as viewed in the axial direction. The two surfaces 13 of the permanent magnet 1 are located so as to contact (surface-contact) the wall surfaces 32a of the magnet hole 32. That is, the permanent magnet 1 is fixed in the manner in which the permanent magnet 1 is positioned by the pair of wall surfaces 32a having a tapered shape, as viewed from the side in the direction of arrow Z1. The surface 13 is an example of the "outer side surface." The wall surface 32a is an example of the "tilted surface."

As shown in FIG. 1, the hub member 2 is engaged with an engagement portion 3a (see FIG. 2) of the rotor core 3 placed on the side in the direction of arrow R2 of the hub member 2 and is thus fixed to the rotor core 3. The hub member 2 is also fixed to the shaft, not shown. The hub member 2, the rotor core 3, and the shaft are configured to rotate together about the axis C1.

Figure 2:
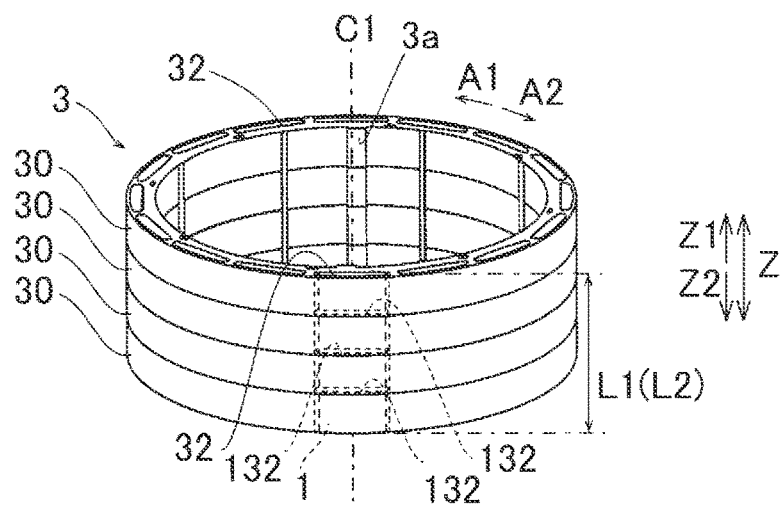
FIG. 2 is a perspective view of the rotor according to the embodiment of the present disclosure.

As shown in FIG. 2, the rotor core 3 includes a plurality of (e.g., four) core blocks 30 having an annular shape. The plurality of core blocks 30 are stacked in the axial direction with their axes C1 aligned. Each core block 30 is formed by stacking a plurality of electrical steel sheets 31 having an annular shape (see FIG. 1; e.g., silicon steel sheets) in the axial direction.

As shown in FIG. 2, each core block 30 has a plurality of (e.g., 16) holes 132 that are through holes extending in the axial direction. The plurality of core blocks 30 are stacked in the axial direction such that the holes 132 overlap (or are completely aligned with) each other as viewed from the side in the direction of arrow Z1. The holes 132 in the plurality of core blocks 30 are thus connected so as to be continuous with each other, whereby the magnet holes 32 in which the permanent magnets 1 are inserted in the axial direction are formed in the rotor core 3. As shown in FIG. 2, the plurality of magnets holes 32 are arranged in a circular pattern at regular angular intervals as viewed from the side in the direction of arrow Z1.

The permanent magnets 1 are disposed in the plurality of magnet holes 32. As shown in FIG. 1, the magnet hole 32 and the permanent magnet 1 are bonded with the adhesive 4 and thus fixed to each other. As shown in FIG. 2, the axial length L2 of the magnet hole 32 is slightly smaller than the axial length L1 of the permanent magnet 1.

As shown in FIG. 4, the inner side surface of the magnet hole 32 has the pair of wall surfaces 32a that are tilted from the radially outer side (the side in the direction of arrow R2) toward the radially inner side (the side in the direction of arrow R1), as viewed in the axial direction. The pair of wall surfaces 32a are tilted so as to be away from each other as they extend from the radially outer side (the side in the direction of arrow R2) and to the radially inner side (the side in the direction of arrow R1).

As shown in FIG. 4, the magnet hole 32 has two grooves 32b which are recessed toward the radially inner side as viewed in the axial direction and in which the adhesive 4 applied to the permanent magnet 1 is located after the permanent magnet 1 is inserted in the magnet hole 32. The grooves 32b are formed so as to extend in the axial direction. Particularly, the two grooves 32b are formed near both ends of the magnet hole 32 in the circumferential direction, and a protruding portion 32c is formed between the two grooves 32b. Each of the two grooves 32b has a bottom 32d, and a groove depth dl from a top surface 32e of the protruding portion 32c (e.g. protrusion) to the bottom 32d is larger than a thickness t1 (see FIG. 8) described below and is equal to or less than a thickness t2.

In the present embodiment, each magnet hole 32 of the rotor core 3 has, on the inner side surface of the magnet hole 32 on the radially inner side, the protruding portion 32c that protrudes toward the radially outer side. Specifically, each protruding portion 32c of the rotor core 3 is formed in the middle part of the magnet hole 32 in the circumferential direction so as to protrude from the radially inner side toward the radially outer side of the magnet hole 32. Typically, magnetic saturation is more likely to be reached in both ends of the magnet hole 32 in the circumferential direction than in the middle part of the magnet hole 32 in the circumferential direction. The protruding portion 32c is therefore formed at a position corresponding to the middle part of the magnet hole 32 in the circumferential direction. Magnetic resistance can thus be reduced as compared to the case where no protruding portion 32c is formed or the case where the protruding portion 32c is formed at positions corresponding to both ends of the magnet hole 32 in the circumferential direction. As a result, magnetic resistance can be reduced at a position where magnetic saturation is relatively less likely to be reached.

As shown in FIG. 4, the adhesive 4 is placed in contact with a part of the surface 11 of the permanent magnet 1 on the radially inner side. For example, the adhesive 4 is placed only on a part of the surface 11 of the permanent magnet 1 on the radially inner side.

As shown in FIG. 3, the adhesive 4 is placed on two parts of the surface 11 of the permanent magnet 1, namely the parts on one side (the side in the direction of arrow X1) and the other side (the side in the direction of arrow X2) of the lateral direction of the surface 11 of the permanent magnet 1. The adhesive 4 is formed so as to extend in the longitudinal direction (in the axial direction from a part on the side in the direction of arrow Z1 to a part on the side in the direction of arrow Z2) of the surface 11 of the permanent magnet 1.

In the state where the permanent magnet 1 and the rotor core 3 have been bonded with the adhesive 4 (FIG. 5B), the adhesive 4 contains a foaming agent 41 that has been foamed and a base resin 42 and a curing agent 43 which have been cured. The foaming agent 41 is an example of the "expanding agent."

The foaming agent 41 is an expanding agent that foams (expands) when heated to a temperature equal to or higher than an expansion temperature T1. The base resin 42 and the curing agent 43 have the property of curing when heated to a temperature equal to or higher than a curing temperature T2 that is higher than the expansion temperature T1.

Particularly, in the present embodiment, the foaming agent 41 is capsules (see FIG. 6), and when heated to a temperature equal to or higher than the expansion temperature T1, the capsules expand and increase in volume. For example, the adhesive 4 contains isopentane as the foaming agent 41. For example, the expansion temperature T1 can be set to a foaming temperature at which the capsules foam.

Figures 5A, 5B:
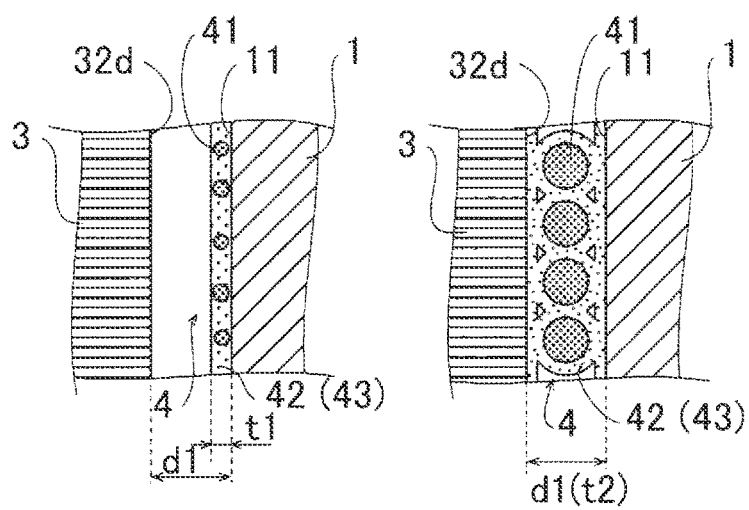
FIGS. 5A and 5B show sectional views schematically showing the states before and after expansion of the adhesive for the rotor according to the embodiment of the present disclosure.
Figure 6:
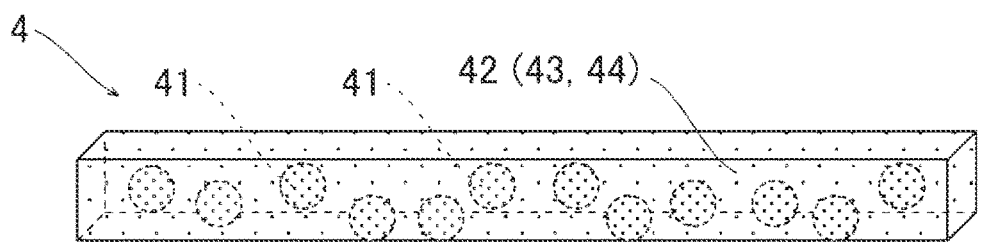
FIG. 6 is a conceptual view showing the configuration of the adhesive for the rotor according to the embodiment of the present disclosure.

As shown in FIG. 5B, as the foaming agent 41 foams and expands, the thickness of the adhesive 4 changes from the thickness t1 to the thickness t2. As a result, the adhesive 4 extends from the surface 11 of the permanent magnet 1 to the bottoms 32d of the grooves 32b. Even after heating, the foaming agent 41 remains as the expanded capsules within the adhesive 4 (in the magnet hole 32).

Figure 8:
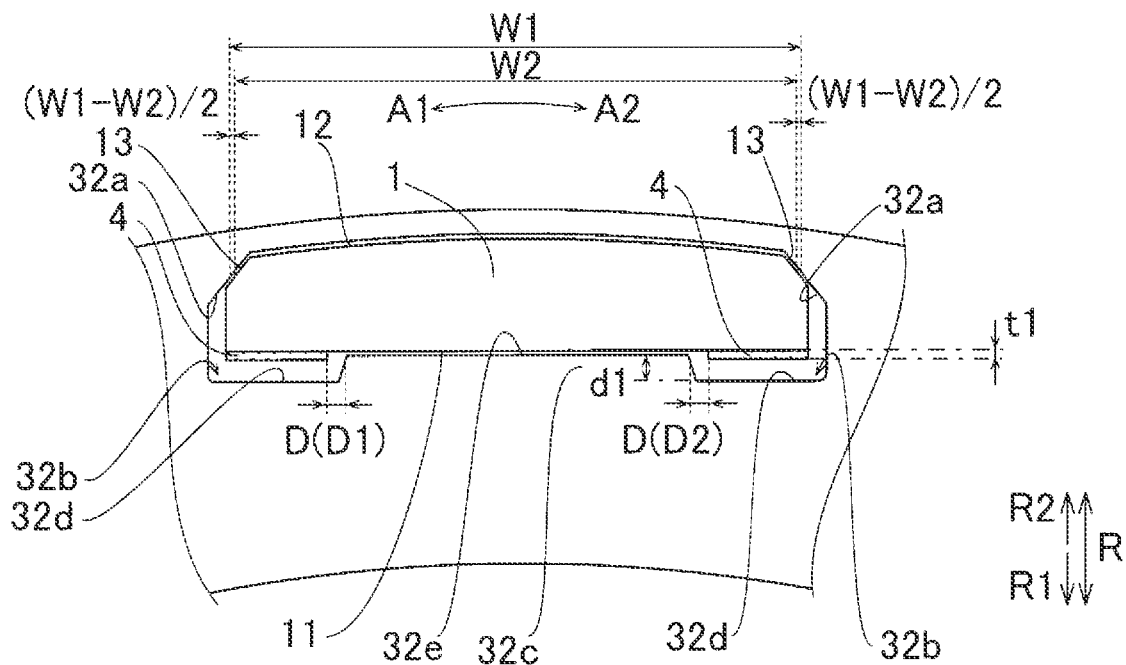
FIG. 8 is a partial plan view showing the state where the permanent magnet has been inserted in the rotor core of the rotor according to the embodiment of the present disclosure.
Figure 9:
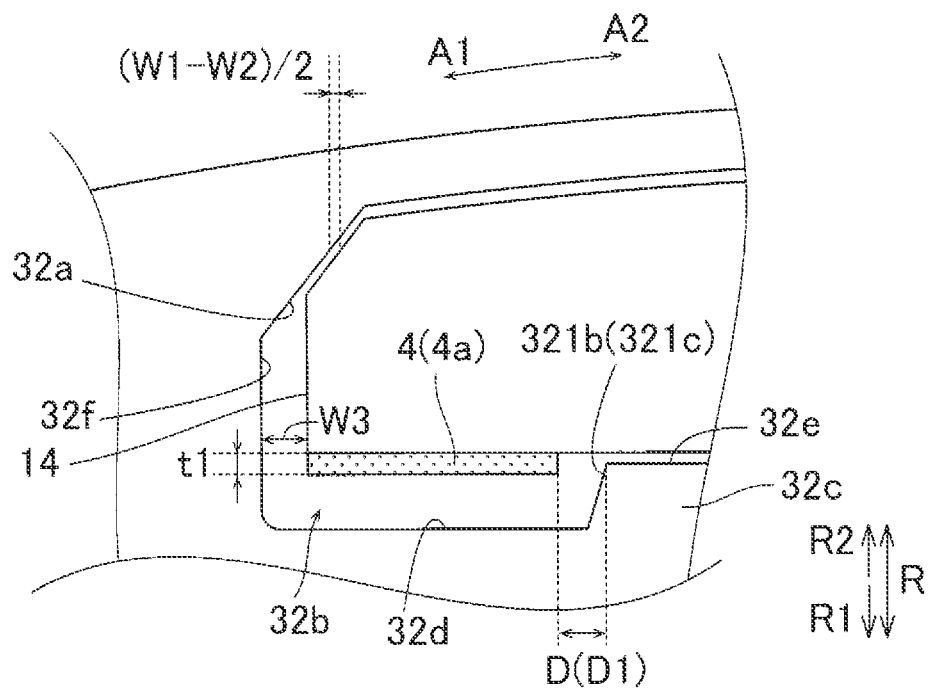
FIG. 9 is a partial enlarged view showing a part of the rotor core shown in FIG. 8 which is located on the side in the direction of arrow A1.
Figure 10:
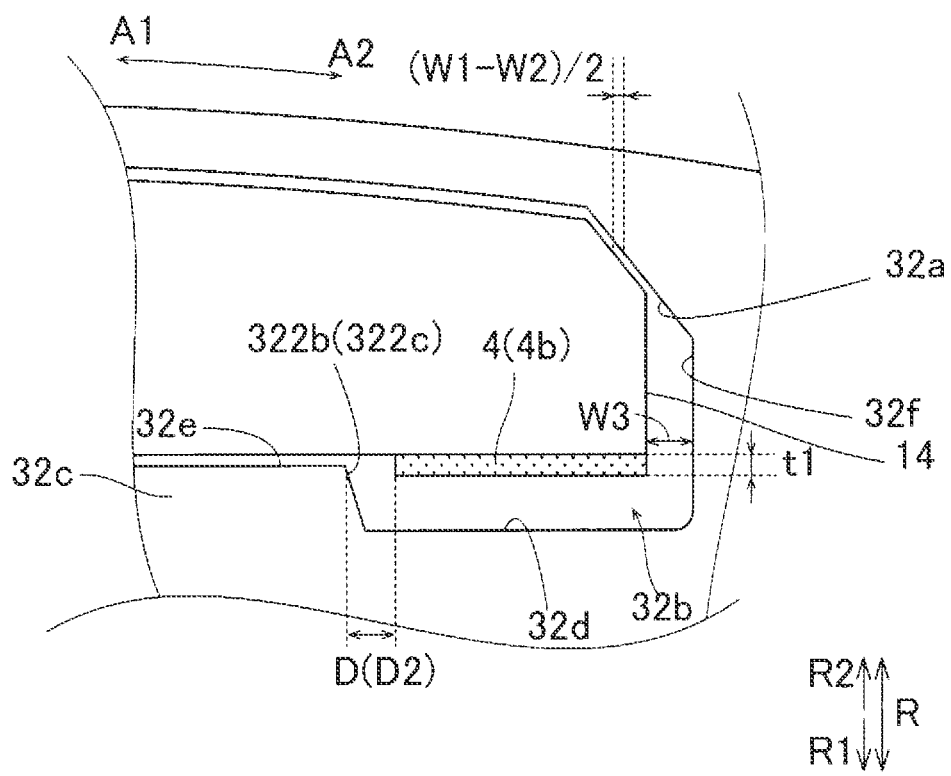
FIG. 10 is a partial enlarged view showing a part of the rotor core shown in FIG. 8 which is located on the side in the direction of arrow A2.

Preferably, the content of the foaming agent 41 in the adhesive 4 is set so that, as the foaming agent 41 foams and expands, the thickness of the adhesive 4 changes to the thickness t2 that is three times or more and eight times or less the thickness t1 of the adhesive 4 before expansion. As shown in FIGS. 8 to 10, in the state where the foaming agent 41 of the adhesive 4 has not been foamed, the adhesive 4 is separated from the bottoms 32d of the grooves 32b, and the surfaces 13 of the permanent magnet 1 are separated from the wall surfaces 32a of the magnet hole 32. In the state where the foaming agent 41 of the adhesive 4 has been foamed (see FIG. 4), the adhesive 4 has expanded and has been brought into contact with the bottoms 32d of the grooves 32b and the permanent magnet 1 has been pressed toward the radially outer side to such a position that the surfaces 13 of the permanent magnet 1 contact the wall surfaces 32a of the magnet hole 32.

The base resin 42 contains, e.g., an epoxy resin (e.g., bisphenol-A liquid epoxy and epoxy resin polymer). The curing agent 43 contains, e.g., dicyandiamide. The base resin 42 and the curing agent 43 have the property of curing when heated to a temperature equal to or higher than the curing temperature T2. That is, the adhesive 4 is a thermosetting adhesive. The permanent magnet 1 and the rotor core 3 are bonded and fixed together as the base resin 42 and the curing agent 43 of the adhesive 4 are cured. The curing temperature T2 is higher than a drying temperature T3 described below and is higher than the expansion temperature T1. The curing temperature T2 is set according to the combination of the base resin 42 and the curing agent 43 and is lower than a product maximum temperature T5. For example, the product maximum temperature T5 can be set to a temperature that is not so high as to affect performance as the rotor 100.

Figure 11A:
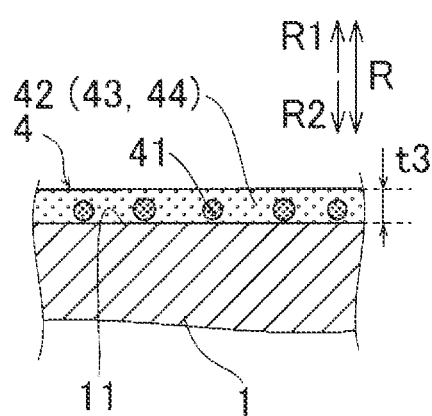
FIGS. 11A and 11B show partial sectional views schematically illustrating how to reduce the thickness of the adhesive for the rotor according to the embodiment of the present disclosure.

As shown in FIG. 11A, in the state where the permanent magnet 1 and the rotor core 3 have not been bonded with the adhesive 4 and the adhesive 4 has not been dried, the adhesive 4 contains a volatile diluting solvent 44 as a volatile agent, the foaming agent 41 as an expanding agent that has not been foamed, and the base resin 42 and the curing agent 43 which have not been cured.

In the state where the permanent magnet 1 and the rotor core 3 have not been bonded with the adhesive 4 and the adhesive 4 has been dried (see FIG. 11B), the adhesive 4 contains the foaming agent 41, and the base resin 42 and the curing agent 43 which have not been cured. That is, after the adhesive 4 is dried, the adhesive 4 contains a reduced amount of diluting solvent 44 or contains substantially no diluting solvent 44.

Examples of the diluting solvent 44 include volatile organic solvents such as ketones like methyl ethyl ketone, alcohols, and ethers. In the present embodiment, the diluting solvent 44 contains both methyl ethyl ketone and ethyl acetate. The diluting solvent 44 is less viscous than the foaming agent 41 and the curing agent 43. When contained in the adhesive 4, the diluting solvent 44 therefore serves to reduce viscosity of the adhesive 4 and to increase fluidity of the adhesive 4.

Figure 13:
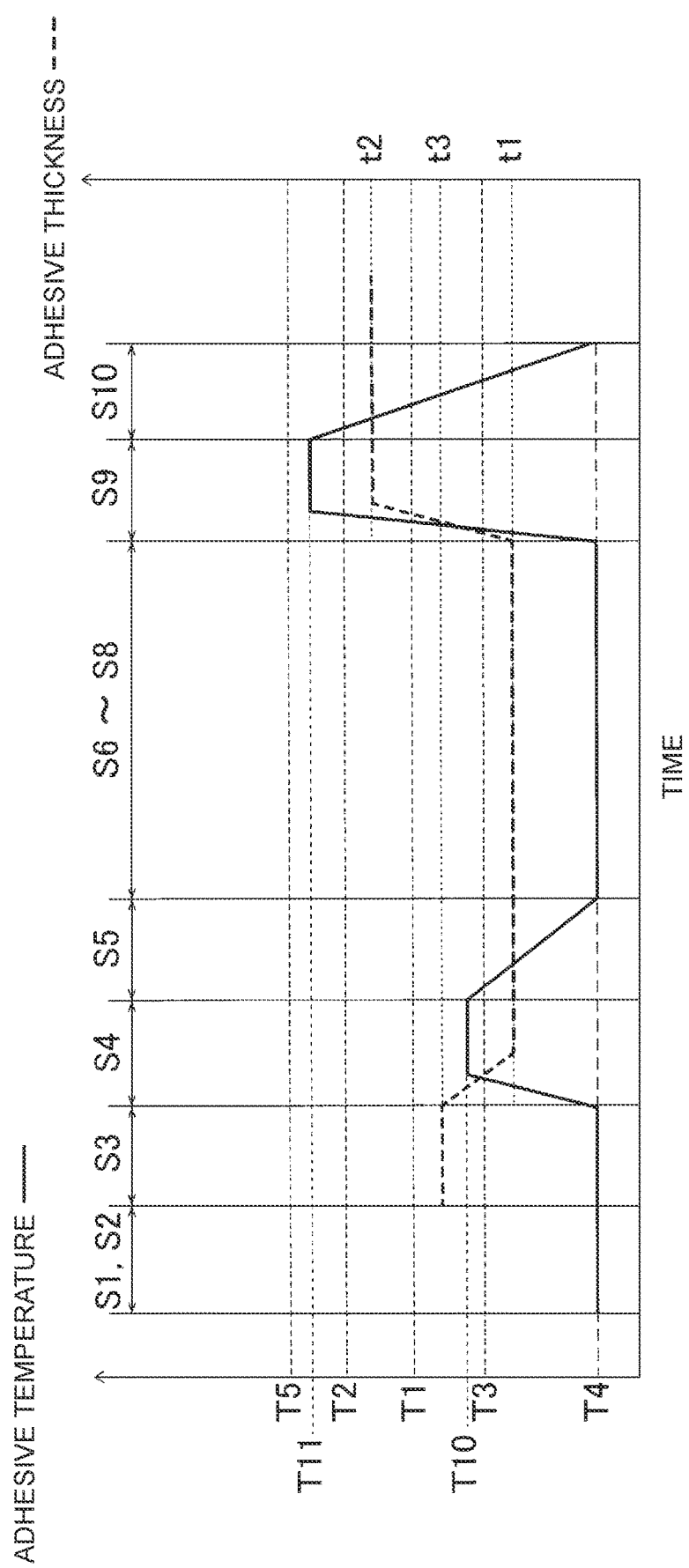
FIG. 13 is a diagram illustrating the thickness and temperature of the adhesive during the manufacturing process of the rotor according to the embodiment of the present disclosure.

The diluting solvent 44 volatilizes when heated to a temperature equal to or higher than the drying temperature T3 (e.g., a temperature T10 in FIG. 13). For example, the drying temperature T3 can be set to the boiling point of the diluting solvent 44 or a temperature close to the boiling point of the diluting solvent 44.

The drying temperature T3 is lower than the expansion temperature T1. The expansion temperature T1 is lower than the curing temperature T2. Accordingly, by heating the adhesive 4 to a temperature lower than the expansion temperature T1 and equal to or higher than the drying temperature T3, the diluting solvent 44 can be volatilized without expanding the foaming agent 41.

As shown in FIG. 1A, the adhesive 4 that has not been dried has a thickness t3 in the direction perpendicular to the lateral direction of the permanent magnet 1 (the direction of arrow R1 and the direction of arrow R2). As the diluting solvent 44 is volatilized, the volume and thickness of the adhesive 4 are reduced. That is, the adhesive 4 that has been dried has the thickness t1 smaller than the thickness t3. Preferably, the thickness t1 is equal to or smaller than nine tenths (more preferably, equal to or smaller than four fifths) of the thickness t3.

Manufacturing Method of Rotor According to Embodiment

Figure 11B:
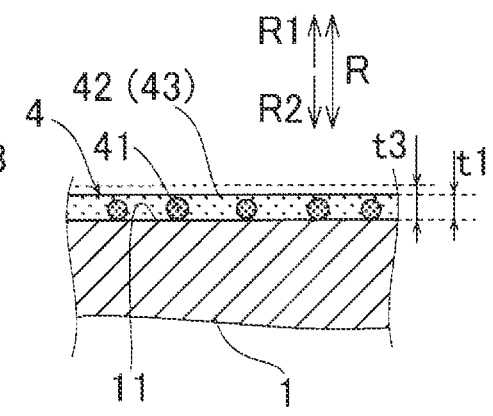
Figure 12:
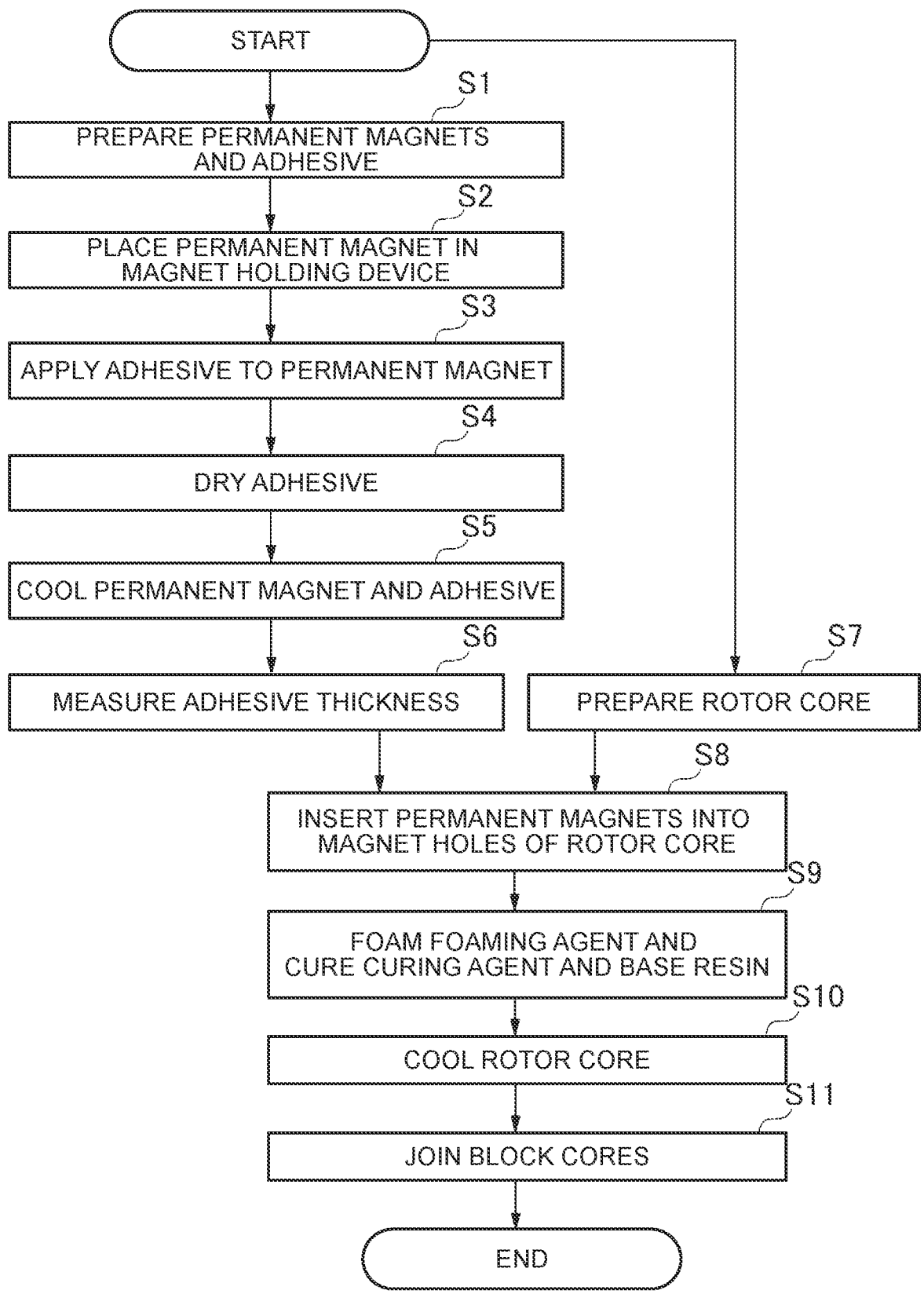
FIG. 12 is a flowchart illustrating a manufacturing process of the rotor according to the embodiment of the present disclosure.

Next, a method for manufacturing the rotor 100 according to the present embodiment will be described with reference to FIGS. 3, 5A and 5B, and 8 to 18. FIG. 12 is a flowchart of the method for manufacturing the rotor 100 according to the present embodiment. FIG. 13 is a diagram illustrating the state of the adhesive 4 during the manufacturing process of the rotor 100 (steps S1 to S10), where the abscissa represents time and the ordinate represents the temperature of the adhesive 4 (left ordinate) and the thickness of the adhesive 4 (right ordinate).

Figure 14:
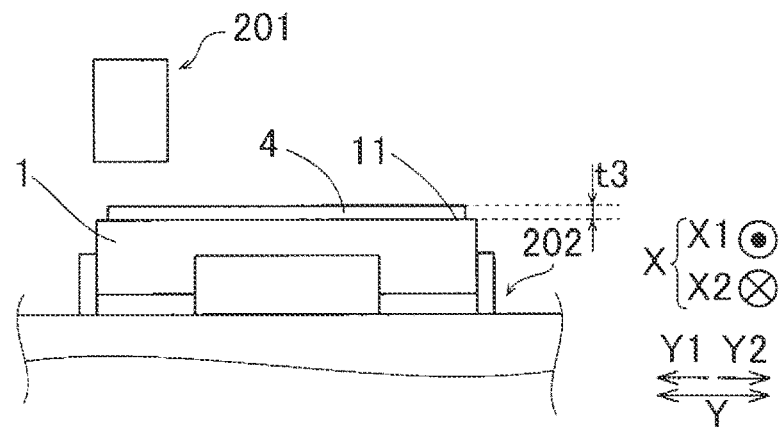
FIG. 14 is a view illustrating the step of applying the adhesive of the rotor according to the embodiment of the present disclosure.

First, the step of preparing permanent magnets 1 and an adhesive 4 is performed in step S1. Particularly, a plurality of permanent magnets 1 including neodymium magnets are prepared. In the present embodiment, an adhesive 4 (see FIG. 8) is prepared which contains a foaming agent 41 as an expanding agent that expands when heated to a temperature equal to or higher the expansion temperature T1, a volatile diluting solvent 44, and a base resin 42 and a curing agent 43 which cure when heated to a temperature equal to or higher than the curing temperature T2 that is higher than the expansion temperature T1. As shown in FIG. 14, the adhesive 4 thus prepared is placed in an adhesive applying device 201. The process then proceeds to step S2.

As shown in FIG. 14, the step of mounting the permanent magnet 1 on a magnet holding device 202 is performed in step S2. The process then proceeds to step S3.

The step of applying the adhesive 4 to the permanent magnet 1 so that the adhesive 4 is placed on the permanent magnet 1 is performed in step S3. Particularly, the adhesive applying device 201 and the magnet holding device 202 are moved relative to each other while the adhesive 4 is being discharged from an opening at the distal end of a nozzle of the adhesive applying device 201, whereby the adhesive 4 is applied to (placed on) the permanent magnet 1. The adhesive 4 having a thickness t3 is thus formed. Specifically, the adhesive 4 is applied so as to be placed on a part of the permanent magnet 1 which is located on the radially inner side in the state where the permanent magnet 1 has been inserted in a magnet hole 32 (on the assumption that the permanent magnet 1 has been inserted in the magnet hole 32) and which is located on one side (and the other side) of a protruding portion 32c in the circumferential direction of a rotor core 3 as viewed in the direction of the rotation axis of the rotor 100 in the state where the permanent magnet 1 has been inserted in a magnet hole 32 (on the assumption that the permanent magnet 1 has been inserted in the magnet hole 32). For example, as shown in FIG. 3, the adhesive 4 is applied in the direction of Y-axis to a part of a surface 11 of the permanent magnet 1 on the side in the direction of arrow X2 and is then applied in the direction of Y-axis to a part of the surface 11 of the permanent magnet 1 on the side in the direction of arrow X1. The adhesive 4 is applied to the permanent magnet 1 so as to have a rectangular shape as viewed in the direction of arrow Z1 and is thus placed on the permanent magnet 1.

In the present embodiment, the adhesive 4 is applied so as not to protrude beyond one end and the other end of the permanent magnet 1 in the circumferential direction. Specifically, the adhesive 4 is applied so as not to protrude in the circumferential direction beyond a side surface 14 (see FIGS. 9 and 10) connected to the surface 11 of the permanent magnet 1 on the radially inner side. For example, the adhesive 4 is applied so as to extend to the end of the surface 11 of the permanent magnet 1 in the circumferential direction.

The step of drying the adhesive 4 to reduce the thickness of the adhesive 4 is performed in step S4. As shown in FIG. 11B, the adhesive 4 is dried to reduce the thickness of the adhesive 4 to a thickness t1 smaller than the thickness t3 of the adhesive 4 before drying.

Particularly, as the diluting solvent 44 contained in the adhesive 4 is volatilized, the thickness of the adhesive 4 is reduced from the thickness t3 to the thickness t1. As shown in FIG. 13, the adhesive 4 is heated to the temperature T10 that is equal to or higher than the drying temperature T3 and lower than the expansion temperature T1, whereby the adhesive 4 is dried and the thickness of the adhesive 4 is reduced from the thickness t3 to the thickness t1.

Figure 15:
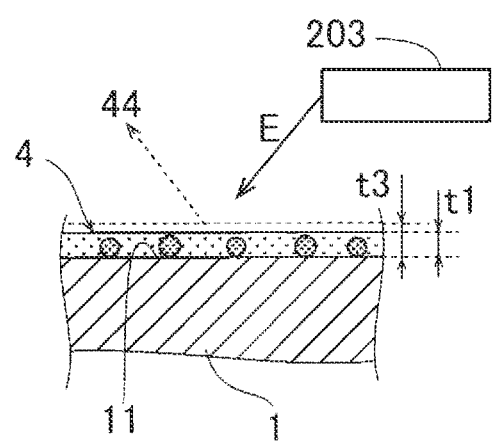
FIG. 15 is a view illustrating the step of drying the adhesive of the rotor according to the embodiment of the present disclosure.

As shown in FIG. 15, hot air E (air) having a temperature higher than room temperature T4 (the temperature T10 equal to or higher than the drying temperature T3 and lower than the expansion temperature T1) is blown from a drying device 203 onto the adhesive 4 to volatilize the diluting solvent 44 contained in the adhesive 4. The diluting solvent 44 thus volatilized is discharged by ventilation with the hot air E. The process then proceeds to step S5.

As shown in FIG. 13, the step of cooling the permanent magnet 1 and the adhesive 4 is performed in step S5. The permanent magnet 1 is thus contracted in the direction of magnetization (the radial direction of the rotor 100). For example, the permanent magnet 1 and the adhesive 4 are cooled to a temperature close to the room temperature T4. The process then proceeds to step S6.

The step of measuring the thickness of the adhesive 4 is performed in step S6. That is, it is verified (checked) if the thickness of the adhesive 4 has been reduced to the thickness t1. The process then proceeds to step S7.

The step of preparing the rotor core 3 is performed in step S7. In the present embodiment, as shown in FIG. 8, the step of forming grooves 32b in the magnet hole 32 is performed. In this step, the grooves 32b are formed next to the protruding portion 32c in the circumferential direction as viewed in the direction of the rotation axis of the rotor 100, so that the grooves 32b are recessed toward the radially inner side of the rotor core 3 and extend in the axial direction and so that the adhesive 4 applied to the permanent magnet 1 is placed in the grooves 32b after the permanent magnet 1 is inserted into the magnet hole 32. Specifically, the rotor core 3 is prepared in which each magnet hole 32 has the grooves 32b having a depth d1 larger than the thickness t1 of the dried adhesive 4.

Figure 16:
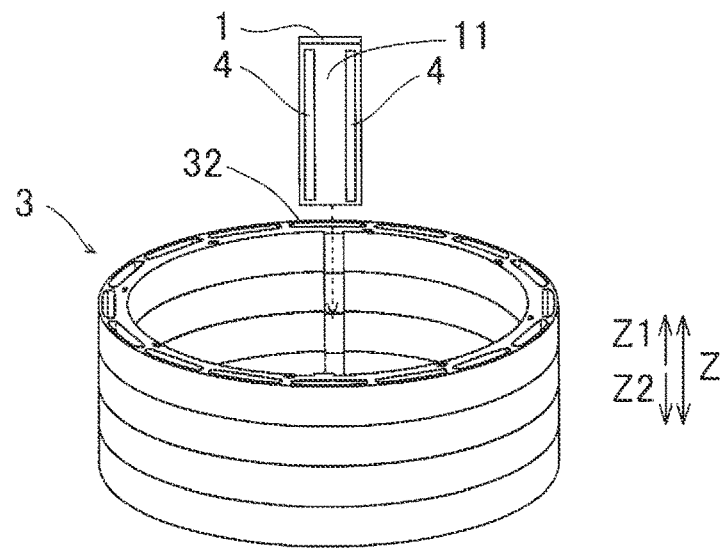
FIG. 16 is a perspective view illustrating the step of inserting the permanent magnet into the rotor core of the rotor according to the embodiment of the present disclosure.

Particularly, a plurality of electrical steel sheets 31 are blanked with a progressive press, not shown. At this time, a plurality of annular electrical steel sheets 31 are formed which have holes 132 (see FIG. 2) with the grooves 32b. As shown in FIG. 16, the plurality of electrical steel sheets 31 are stacked in the axial direction to form a plurality (e.g., four) of core blocks 30. The core blocks 30 are stacked in the axial direction. A part of the core blocks 30 is rotated or reversely rotated (rotated and stacked) in the circumferential direction relative to the remainder of the core blocks 30. The rotor core 3 is thus formed, and the holes 132 of the plurality of core blocks 30 are connected in the axial direction so as to be continuous with each other, whereby magnet holes 32 are formed. The process then proceeds to step S8.

The step of inserting the permanent magnets 1 having the thinned adhesive 4 placed thereon into the magnet holes 32 of the rotor core 3 is performed in step S8. Specifically, the rotor core 3 and the permanent magnet 1 whose surface 11 having the adhesive 4 placed thereon faces the radially inner side are moved relative to each other in the axial direction, whereby the permanent magnet 1 is inserted to each of the magnet holes 32. Although FIG. 16 shows only one permanent magnet 1, the permanent magnet 1 is inserted into each of the magnet holes 32.

Figure 7:
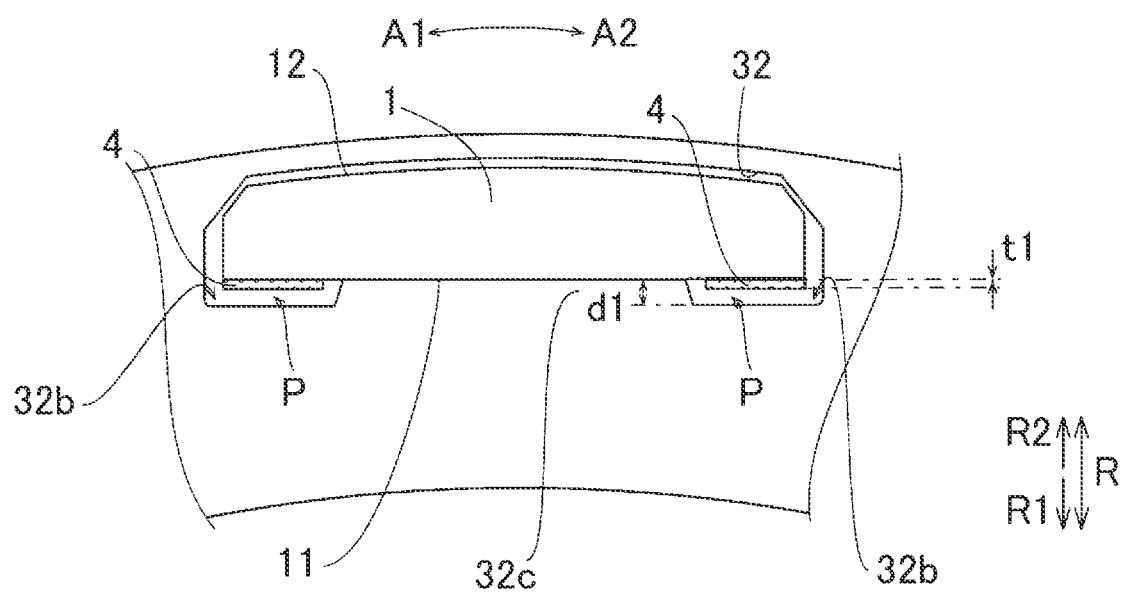
FIG. 7 is a view showing the state where the surface of the permanent magnet on the radially inner side is in contact with a protruding portion.

In the present embodiment, as shown in FIG. 7, in the state where the surface 11 of the permanent magnet 1 on the radially inner side is in contact with the protruding portion 32c on the assumption that the permanent magnet 1 has been inserted in the magnet hole 32 and before the foaming agent 41 of the adhesive 4 is expanded (foamed), each of adhesive placement portions P (clearances), in which the adhesive 4 is placed and which, as viewed in the direction of the rotation axis of the rotor 100, is provided between the surface 11 of the permanent magnet 1 on the radially inner side and a corresponding one of the grooves 32b formed next to the protruding portion 32c in the circumferential direction and recessed toward the radially inner side, covers the part of the adhesive 4 applied to the permanent magnet 1 on the radially inner side and the parts of the adhesive 4 on both sides in the circumferential direction. That is, each of the adhesive placement portions P (clearances) is formed so as to cover the entire outer surface of the adhesive 4 (other than the part facing the permanent magnet 1) as viewed in the direction of the rotation axis of the rotor 100.

Specifically, in the present embodiment, as shown in FIGS. 8 to 10, the following expression (1) is satisfied on the assumption that the permanent magnet 1 has been inserted in the magnet hole 32 so that the middle of the permanent magnet 1 in the circumferential direction matches the middle of the magnet hole 32 in the circumferential direction and before the foaming agent 41 of the adhesive 4 is expanded, where W1 represents the width of the magnet hole 32 in the circumferential direction, W2 represents the width of the permanent magnet 1 in the circumferential direction at the same radial position, and D represents the interval in the circumferential direction between an end of the protruding portion 32c in the circumferential direction and the adhesive 4, as viewed in the axial direction.

[Expression 3]

$$(W1-W2)/2 < D \quad (1)$$

Specifically, the adhesive 4 is applied to the radially inner side of the permanent magnet 1 so as to be placed on both one side (the side in the direction of arrow A1) and the other side (the side in the direction of arrow A2) of the protruding portion 32c in the circumferential direction of the rotor core 3 as viewed in the axial direction in the state where the permanent magnet 1 has been inserted in the magnet hole 32 (on the assumption that the permanent magnet 1 has been inserted in the magnet hole 32) (see FIG. 8). The following expressions (2), (3) are satisfied after the permanent magnet 1 is inserted into the magnet hole 32 and before the adhesive 4 is expanded, where D1 represents the interval in the circumferential direction between one end 321c (see FIG. 9) of the protruding portion 32c in the circumferential direction and the adhesive 4 (adhesive 4a) placed near the one end 321c of the protruding portion 32c, and D2 represents the interval in the circumferential direction between the other end 322c (see FIG. 10) of the protruding portion 32c in the circumferential direction and the adhesive 4 (adhesive 4b) placed near the other end 322c of the protruding portion 32c, as viewed in the axial direction.

[Expression 4]

$$(W1-W2)/2 < D1 \quad (2)$$

$$(W1-W2)/2 < D2 \quad (3)$$

As shown in FIG. 8, the protruding portion 32c is shaped (tapered) so as to become thinner as it extends to the radially outer side. The interval D (D1, D2) between the adhesive 4 (adhesive 4a, adhesive 4b) and a part of the tapered protruding portion 32c which faces the adhesive 4 in the circumferential direction satisfies the above expression (1) (expression (2), expression (3)).

More particularly, in the present embodiment, the above expressions (2), (3) are satisfied after the permanent magnet 1 is inserted into the magnet hole 32 and before the adhesive 4 is expanded, where W1 represents the width in the circumferential direction between the pair of wall surfaces 32a of the magnet hole 32, and W2 represents the width in the circumferential direction between the pair of surfaces 13 of the permanent magnet 1 at the same radial position, as viewed in the axial direction.

In the case where the middle of the protruding portion 32c in the circumferential direction matches the middle of the magnet hole 32 in the circumferential direction (that is, in the case where the protruding portion 32c is formed in the middle part of the magnet hole 32 in the circumferential direction), the interval D1 is equal to the interval D2.

In the present embodiment, the interval D (interval D1, interval D2) in the circumferential direction between the end (one end 321c, the other end 322c) of the protruding portion 32c in the circumferential direction and the adhesive 4 is larger than the thickness t1 of the adhesive 4 before expansion of the foaming agent 41.

In the present embodiment, the above expression (1) (expression (2), expression (3)) is satisfied, where D (D1, D2) represents the interval in the circumferential direction between each of the ends (side ends) (one end 321c, the other end 322c) of the protruding portion 32c in the circumferential direction, which are an inner side surface 321b (see FIG. 9) and an inner side surface 322b (see FIG. 10) of the groove 32b in the circumferential direction, and the adhesive 4.

The width W3 (see FIGS. 9 and 10) in the circumferential direction between a side surface 32f other than the wall surface 32a of the magnet hole 32 and the side surface 14 other than the surface 13 of the permanent magnet 1 is larger than (W1−W2)/2. Clearance between the side surface 32f of the magnet hole 32 and the side surface 14 of the permanent magnet 1 has a function to restrain magnetic flux traveling from the permanent magnet 1 toward the stator 102 from traveling around the permanent magnet 1 toward a portion located radially inside the permanent magnet 1. This clearance can restrain reduction in torque which is caused by reduction in amount of magnetic flux traveling toward the stator 102.

In the present embodiment, the above expression (1) is satisfied by preparing the rotor core 3 having the protruding portions 32c that satisfy the interval D (D1, D2) in the circumferential direction between the end of the protruding portion 32c in the circumferential direction and the adhesive 4 as given by the expression (1) (expression (2), expression (3)) and/or applying the adhesive 4 so as to satisfy the interval D (D1, D2) in the circumferential direction between the end of the protruding portion 32c in the circumferential direction and the adhesive 4 as given by the expression (1) (expression (2), expression (3)). Specifically, the width of the adhesive 4 in the circumferential direction, the position on the permanent magnet 1 to which the adhesive 4 is applied, and the width of the protruding portion 32c (groove 32b) in the circumferential direction are adjusted so as to satisfy the expression (1) (expression (2), expression (3)).

Figure 17:
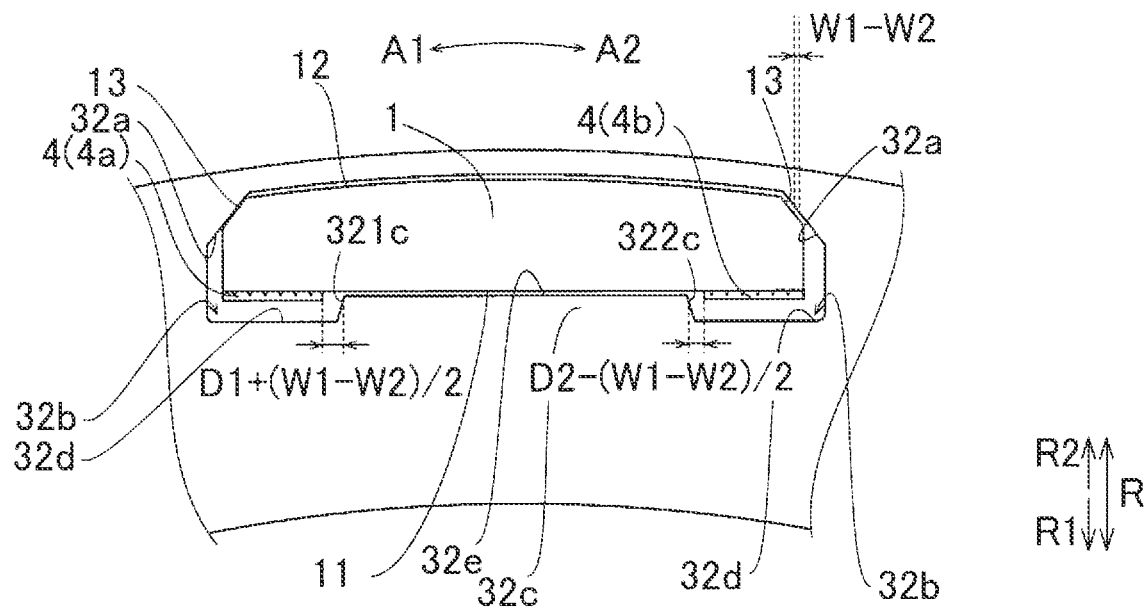
FIG. 17 is a view showing the state where the permanent magnet has moved in the circumferential direction when inserted into the rotor core.

As shown in FIG. 17, when the permanent magnet 1 is inserted into the magnet hole 32, the permanent magnet 1 may move (wobble) in the circumferential direction. FIG. 17 shows the permanent magnet 1 that has moved by the amount corresponding to (W1−W2)/2 in the direction of arrow A1. In this case, on the side in the direction of arrow A1, the surface 13 of the permanent magnet 1 and the wall surface 32a of the magnet hole 32 contact each other. On the side in the direction of arrow A2, the interval between the surface 13 of the permanent magnet 1 and the wall surface 32a of the magnet hole 32 is "W1−W2."

On the side in the direction of arrow A1, the interval in the circumferential direction between the one end 321c of the protruding portion 32c in the circumferential direction and the adhesive 4 (4a) placed near the one end 321c of the protruding portion 32c is "D1+(W1−W2)/2." On the side in the direction of arrow A2, the interval in the circumferential direction between the other end 322c of the protruding portion 32c in the circumferential direction and the adhesive 4 (4b) placed near the other end 322c of the protruding portion 32c is "D2−(W1−W2)/2." Since (W1−W2)/2<D2 as described above, D2−1 (W1−W2)/2 is positive. That is, the adhesive 4 (4b) does not contact the protruding portion 32c of the magnet hole 32. The adhesive 4 (4b) can thus be restrained from being peeled off. Similarly, when the permanent magnet 1 moves in the direction of arrow A2, the adhesive 4 (4a) does not contact the protruding portion 32c of the magnet hole 32.

In the present embodiment, as shown in FIG. 7, the depth d1 of the groove 32b recessed toward the radially inner side is larger than the thickness t1 of the adhesive 4, as viewed in the direction of the rotation axis, in the state where the surface 11 of the permanent magnet 1 on the radially inner side is in contact with the protruding portion 32c on the assumption that the permanent magnet 1 has been inserted in the magnet hole 32 and before the foaming agent 41 of the adhesive 4 is expanded. That is, as shown in FIG. 8, the bottom 32d of the groove 32b of the magnet hole 32 is separated from the adhesive 4 having the thickness t1.

Figure 18:
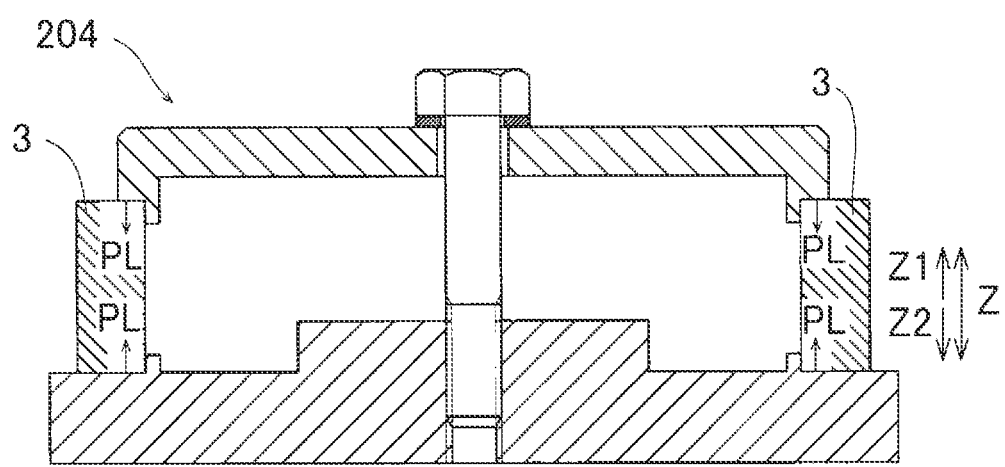
FIG. 18 is a sectional view illustrating the step of curing the adhesive of the rotor according to the embodiment of the present disclosure.

As shown in FIG. 18, the step of curing the base resin 42 and the curing agent 43 of the adhesive 4 to bond the permanent magnet 1 and the rotor core 3 is performed in step S9. Specifically, while the rotor core 3 having the permanent magnets 1 placed therein (and the permanent magnets 1) is being pressed (reference character PL) from both the side in the direction of arrow Z1 and the side in the direction of arrow Z2 by a pressing device 204, the adhesive 4 is heated to a temperature T11 (see FIG. 13) that is higher than the expansion temperature T1 and equal to or higher than the curing temperature T2. For example, hot air is blown to heat the adhesive 4 to the temperature T11.

As shown in FIG. 5B, the foaming agent 41 of the adhesive 4 thus foams and expands, and the thickness of the adhesive 4 changes from the thickness t1 to the thickness t2. The thickness t2 of the adhesive 4 is substantially equal to the distance from the surface 11 of the permanent magnet 1 to the bottom 32d of the groove 32b. That is, the adhesive 4 expands and extends from the surface 11 of the permanent magnet 1 to the bottom 32d of the groove 32b. As the adhesive 4 expands, the surfaces 13 of the permanent magnet 1 are pressed toward the radially outer side, whereby the wall surfaces 32a of the magnet hole 32 contact the surfaces 13 of the permanent magnet 1.

As the base resin 42 and the curing agent 43 of the adhesive 4 are cured, the permanent magnet 1 and the magnet hole 32 are fixed with the cured adhesive 4. The process then proceeds to step S10.

As shown in FIG. 13, the step of cooling the rotor core 3 is performed in step S10. For example, cooling is performed until the rotor core 3 and the adhesive 4 are cooled to the room temperature T4. The process then proceeds to step S11.

The step of joining the plurality of core blocks 30 by laser welding etc. is performed in step S11.

The rotor 100 is thus manufactured. Thereafter, as shown in FIG. 1, the rotor 100 is mounted inside the stator 102 etc., whereby the rotating electrical machine 101 is manufactured.

Effects of Embodiment

The present embodiment has the following effects.

In the present embodiment, as described above, in the state where the surface 11 of the permanent magnet 1 on the radially inner side is in contact with the protruding portion 32c on the assumption that the permanent magnet 1 has been inserted in the magnet hole 32 and before the foaming agent 41 of the adhesive 4 is expanded, each of the adhesive placement portions P, in which the adhesive 4 is placed and which are provided between the surface 11 of the permanent magnet 1 on the radially inner side and the corresponding groove 32b as viewed in the direction of the rotation axis of the rotor 100, covers the part of the adhesive 4 applied to the permanent magnet 1 on the radially inner side and the parts of the adhesive 4 on both sides in the circumferential direction. Each of the adhesive placement portions P (clearances) is thus formed so as to cover the part of the adhesive 4 on the radially inner side. Accordingly, even if the permanent magnet 1 moves (wobbles) in the radial direction when inserted into the magnet hole 32, the adhesive 4 can be restrained from contacting the magnet hole 32. Moreover, each of the adhesive placement portions P (clearances) is formed so as to cover the parts of the adhesive 4 on both sides in the circumferential direction. Accordingly, even if the permanent magnet 1 moves (wobbles) in the circumferential direction when inserted into the magnet hole 32, the adhesive 4 can be restrained from contacting the magnet hole 32. As a result, the adhesive 4 can be restrained from being peeled off due to contact between the adhesive 4 and the magnet hole 32. That is, the amount of adhesive 4 required to bond the permanent magnet 1 can be secured (maintained), whereby the permanent magnet 1 can be firmly fixed.

Since contact between the adhesive 4 and the magnet hole 32 is restrained (that is, the permanent magnet 1 contacts the magnet hole 32 before the adhesive 4 contacts the magnet hole 32), it is not necessary to adjust the attitude of the permanent magnet 1 (position in the circumferential direction) so as to avoid contact of the adhesive 4 with the magnet hole 32 when the permanent magnet 1 is inserted into the magnet hole 32. That is, the permanent magnet 1 can be easily inserted into the magnet hole 32.

In the present embodiment, as described above, the above expression (1) is satisfied after the permanent magnet 1 is inserted into the magnet hole 32 and before the foaming agent 41 of the adhesive 4 is expanded. In the case where the permanent magnet 1 is inserted into the magnet hole 32 so that the middle of the permanent magnet 1 in the circumferential direction matches the middle of the magnet hole 32 in the circumferential direction, there is clearance having a width of (W1−W2)/2 in the circumferential direction between the permanent magnet 1 and the magnet hole 32. The permanent magnet 1 may move (wobble) in the circumferential direction when inserted into the magnet hole 32. Accordingly, in the present embodiment, as described above, the interval D in the circumferential direction between the end of the protruding portion 32c in the circumferential direction and the adhesive 4 is made larger than (W1−W2)/2, so that the adhesive 4 does not contact the protruding portion 32c even if the permanent magnet 1 moves in the circumferential direction by the amount corresponding to (W1−W2)/2 (that is, even if the permanent magnet 1 moves so as to eliminate the clearance). The adhesive 4 can thus be restrained from being peeled off due to contact between the adhesive 4 and the magnet hole 32.

In the present embodiment, as described above, the above expressions (2), (3) are satisfied after the permanent magnet 1 is inserted into the magnet hole 32 and before the adhesive 4 is expanded (foamed), where D1 represents the interval in the circumferential direction between the one end 321c of the protruding portion 32c in the circumferential direction and the adhesive 4 (4a) placed near the one end 321c of the protruding portion 32c, and D2 represents the interval in the circumferential direction between the other end 322c of the protruding portion 32c in the circumferential direction and the adhesive 4 (4b) placed near the other end 322c of the protruding portion 32c, as viewed in the axial direction. Accordingly, even if the permanent magnet 1 moves toward one side or the other side in the circumferential direction when inserted into the magnet hole 32, the adhesive 4 can be restrained from contacting the protruding portion 32c by the interval D1 and the interval D2 which are larger than (W1−W2)/2.

In the present embodiment, as described above, the above expressions (2), (3) are satisfied after the permanent magnet 1 is inserted into the magnet hole 32 and before the adhesive 4 is expanded, where W1 represents the width in the circumferential direction between the pair of wall surfaces 32a of the magnet hole 32, and W2 represents the width in the circumferential direction between the pair of surfaces 13 of the permanent magnet 1 at the same radial position, as viewed in the axial direction. Accordingly, the adhesive 4 can be restrained from contacting the protruding portion 32c in the case where the permanent magnet 1 moves in the circumferential direction when inserted into the magnet hole 32 and the wall surface 32a of the magnet hole 32 contacts the surface 13 of the permanent magnet 1.

As described above, the present embodiment includes the step of bonding the permanent magnet 1 and the rotor core 3 with the adhesive 4 by expanding the foaming agent 41 by heating the adhesive 4 to a temperature equal to or higher than the expansion temperature after inserting the permanent magnet 1 having the adhesive 4 applied thereto into the magnet hole 32. The permanent magnet 1 is thus inserted into the magnet hole 32 while contact between the adhesive 4 and the protruding portion 32c is restrained (that is, while a sufficient amount of adhesive 4 to fix the permanent magnet 1 is secured). The permanent magnet 1 and the rotor core 3 can therefore be reliably bonded together.

In the present embodiment, as described above, the step of preparing the rotor core 3 is the step of preparing the rotor core 3 having the protruding portion 32c formed on the inner side surface of each magnet hole 32 on the radially inner side. In the case where the protruding portion 32c is formed on the inner side surface of each magnet hole 32 on the radially outer side, the adhesive 4 is placed on the surface 12 of the permanent magnet 1 on the radially outer side. In this case, the adhesive 4 is placed between the permanent magnet 1 and the stator 102 placed radially outside the rotor core 3, and the distance between the permanent magnet 1 and the stator 102 is increased by the amount corresponding to the thickness t2 of the adhesive 4. In this respect, in the present embodiment, the protruding portion 32c is formed on the inner side surface of the magnet hole 32 on the radially inner side. The adhesive 4 is therefore not placed between the permanent magnet 1 and the stator 102, whereby the distance between the permanent magnet 1 and the stator 102 can be reduced accordingly.

In the present embodiment, as described above, the step of preparing the adhesive 4 is the step of preparing the adhesive 4 containing the foaming agent 41 that expands when heated to a temperature equal to or higher than the expansion temperature. The permanent magnet 1 can thus be easily bonded (fixed) to the rotor core 3 by merely heating the adhesive 4 (rotor core 3) to a temperature equal to or higher than the expansion temperature.

In the present embodiment, as described above, the above expression (1) (expression (2), expression (3)) are satisfied by preparing the rotor core 3 having the protruding portions 32c that satisfy the interval D in the circumferential direction between the end of the protruding portion 32c in the circumferential direction and the adhesive 4 as given by the expression (1) (expression (2), expression (3)) and/or applying the adhesive 4 so as to satisfy the interval D in the circumferential direction between the end of the protruding portion 32c in the circumferential direction and the adhesive 4 as given by the expression (1) (expression (2), expression (3)). In the case where either the rotor core 3 is prepared or the adhesive 4 is applied so as to satisfy the expression (1) (expression (2), expression (3)), the process can be simplified as compared to the case where both the rotor core 3 is prepared and the adhesive 4 is applied. In the case where both the rotor core 3 is prepared and the adhesive 4 is applied so as to satisfy the expression (1) (expression (2), expression (3)), the expression (1) (expression (2), expression (3)) can be satisfied with high accuracy.

In the present embodiment, as described above, the interval D (D1, D2) in the circumferential direction between the end of the protruding portion 32c in the circumferential direction and the adhesive 4 is larger than the thickness t1 of the adhesive 4 before expansion of the foaming agent 41. The interval D (D1, D2) is therefore relatively large, whereby the adhesive 4 can be reliably restrained from contacting the protruding portion 32c. Even in the case where the protruding portion 32c has a trapezoidal shape (in the case where the one end 321c and the other end 322c of the protruding portion 32c extend toward the adhesive 4, see FIG. 8), the interval D (D1, D2) is relatively large, whereby the adhesive 4 can be restrained from contacting the one end 321c and the other end 322c of the protruding portion 32c.

In the present embodiment, as described above, the step of applying the adhesive 4 is the step of applying the adhesive 4 so that the adhesive 4 does not protrude beyond one end and the other end of the permanent magnet 1 in the circumferential direction. The adhesive 4 can thus be restrained from being peeled off due to contact between the adhesive 4 protruding beyond the one end or the other end of the permanent magnet 1 in the circumferential direction and the rotor core 3.

In the present embodiment, as described above, the above expression (1) is satisfied, where D represents the interval in the circumferential direction between each of the side ends (one end 321c, the other end 322c) of the protruding portion 32c in the circumferential direction, which are the inner side surfaces 321b, 322b of the groove 32b in the circumferential direction, and the adhesive 4. The adhesive 4 can thus be restrained from contacting the inner side surfaces 321b, 322b of the groove 32b in the circumferential direction.

In the present embodiment, as described above, the depth d1 of the groove 32b recessed toward the radially inner side is larger than the thickness t1 of the adhesive 4 as viewed in the direction of the rotation axis. The adhesive 4 can thus be easily restrained from contacting the magnet hole 32 even if the permanent magnet 1 moves (wobbles) in the radial direction when inserted into the magnet hole 32.

[Modifications]

The embodiment disclosed herein is merely by way of example in all respects and should not be construed as restrictive.

For example, the above embodiment shows an example in which the rotor 100 is what is called an inner rotor that is placed radially inside the stator 102. However, the present disclosure is not limited to this. That is, the rotor 100 may be an outer rotor.

The above embodiment shows an example in which the foaming agent 41 is used as an expanding agent. However, the present disclosure is not limited to this. For example, an expanding material other than the foaming agent 41 may be used as an expanding agent.

The above embodiment shows an example in which the adhesive 4 is dried with hot air E (see FIG. 15). However, the present disclosure is not limited to this. For example, a ventilation device may further be included in a manufacturing device of the rotor 100 so that the adhesive 4 can be dried by heating.

Figure 19:
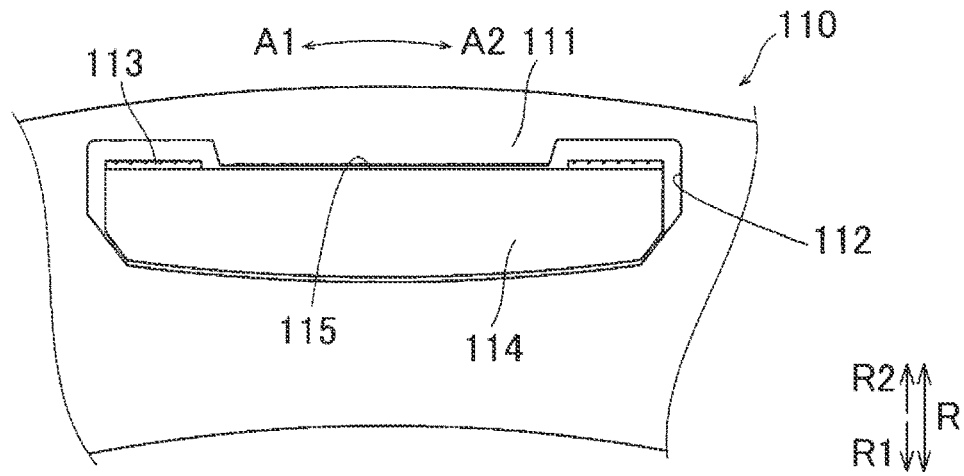
FIG. 19 is a partial plan view showing the state where a permanent magnet has been inserted in a rotor core of a rotor according to a first modification of the embodiment of the present disclosure.

The above embodiment shows an example in which the protruding portion 32c is formed on the inner side surface of the magnet hole 32 on the radially inner side. However, the present disclosure is not limited to this. For example, as in a rotor 110 of a first modification shown in FIG. 19, a protruding portion 111 may be formed on the radially outer side of a magnet hole 112 so as to protrude toward the radially inner side. In this case, an adhesive 113 is placed on a surface 115 of a permanent magnet 114 on the radially outer side.

Figure 20:
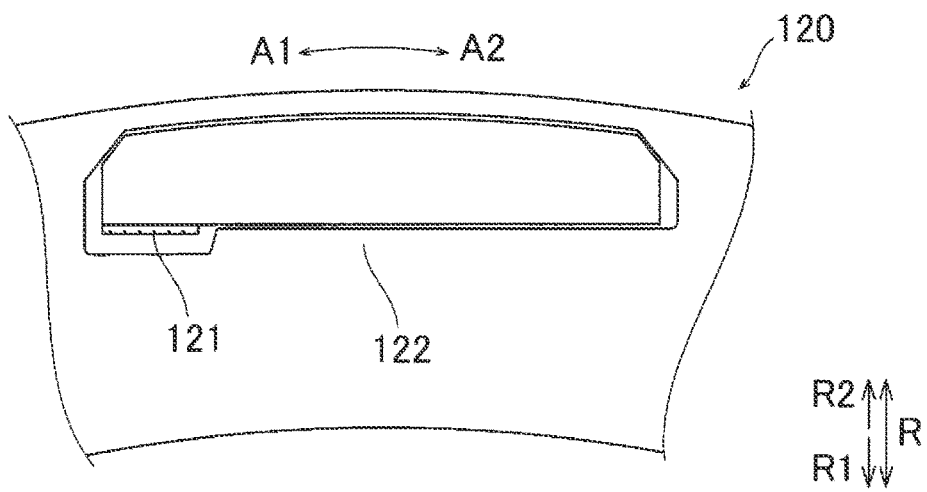
FIG. 20 is a partial plan view showing the state where a permanent magnet has been inserted in a rotor core of a rotor according to a second modification of the embodiment of the present disclosure.

The above embodiment shows an example in which the adhesive 4 is applied so as to be placed on both one side and the other side of the protruding portion 32c in the circumferential direction as viewed in the axial direction in the state where the permanent magnet 1 has been inserted in the magnet hole 32 (on the assumption that the permanent magnet 1 has been inserted in the magnet hole 32). However, the present disclosure is not limited to this. For example, as in a rotor 120 of a second modification shown in FIG. 20, an adhesive 121 may be applied so as to be placed only on one side of a protruding portion 122 in the circumferential direction.

Figure 21:
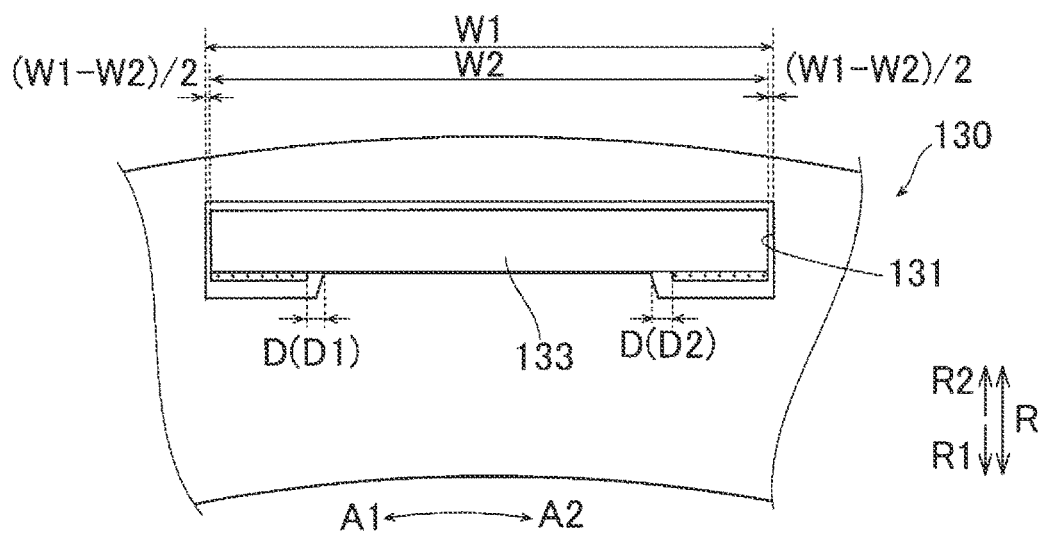
FIG. 21 is a partial plan view showing the state where a permanent magnet has been inserted in a rotor core of a rotor according to a third modification of the embodiment of the present disclosure.

The above embodiment shows an example in which the above expressions (1), (2) are satisfied, where W1 represents the width in the circumferential direction between the pair of wall surfaces 32a of the magnet hole 32, and W2 represents the width in the circumferential direction between the pair of surfaces 13 of the permanent magnet 1 at the same radial position. However, the present disclosure is not limited to this. For example, as in a rotor 130 of a third modification shown in FIG. 21, in the case where both a magnet hole 131 and a permanent magnet 133 have a rectangular shape, the above expressions (2), (3) are satisfied, where W1 represents the width of the magnet hole 131 in the circumferential direction and W2 represents the width of the permanent magnet 133 in the circumferential direction.

The invention claimed is:

1. A method for manufacturing a rotor including a rotor core and a permanent magnet, the rotor core having a magnet hole that extends in a direction of a rotation axis of the rotor and having a protrusion that is formed on an inner side surface of the magnet hole on one of a radially outer side and a radially inner side of the magnet hole so as to protrude toward another of the radially outer side and the radially inner side of the magnet hole and the permanent magnet being inserted in the magnet hole and fixed to the rotor core with an adhesive, comprising the steps of:

applying the adhesive, which contains an expanding agent that expands when heated to a temperature equal to or higher than an expansion temperature, so that the adhesive is placed on one of a radially outer side and a radially inner side of the permanent magnet, and is placed on one side of the protrusion in a circumferential direction of the rotor core as viewed in the direction of the rotation axis of the rotor;

inserting the permanent magnet having the adhesive applied thereto into the magnet hole of the rotor core; and bonding the permanent magnet and the rotor core with the adhesive by expanding the expanding agent by heating the adhesive to the temperature equal to or higher than the expansion temperature after inserting the permanent magnet having the adhesive applied thereto into the magnet hole, wherein in a state where a surface of the permanent magnet on one of the radially outer side and the radially inner side is in contact with the protrusion and before the expanding agent of the adhesive is expanded, an adhesive placement, in which the adhesive is placed and which, as viewed in the direction of the rotation axis of the rotor, is provided between the surface of the permanent magnet on one of the radially outer side and the radially inner side and a groove formed next to the protrusion in the circumferential direction and recessed toward one of the radially outer side and the radially inner side of the magnet hole, covers a part of the adhesive applied to the permanent magnet on one of the radially outer side and the radially inner side and parts of the adhesive on both sides in the circumferential direction.

2. The method for manufacturing a rotor according to claim 1, wherein a following expression (1) is satisfied when the permanent magnet has been inserted in the magnet hole so that a middle of the permanent magnet matches in the circumferential direction with a middle of the magnet hole in the circumferential direction and before the expanding agent of the adhesive is expanded, where W1 represents a width of the magnet hole in the circumferential direction, W2 represents a width of the permanent magnet in the circumferential direction at the same radial position, and D represents an interval in the circumferential direction between an end of the protrusion in the circumferential direction and the adhesive, as viewed in the direction of the rotation axis of the rotor, $$(W1-W2)/2<D \qquad (1).$$

3. The method for manufacturing a rotor according to claim 2, wherein the step of applying the adhesive is a step of applying the adhesive so that the adhesive is placed on both one side and the other side of the protrusion in the circumferential direction as viewed in the direction of the rotation axis of the rotor, and the following expressions (2), (3) are satisfied when the permanent magnet has been inserted in the magnet hole and before the adhesive is expanded, where D1 represents an interval in the circumferential direction between one end of the protrusion in the circumferential direction and the adhesive placed near the one end of the protrusion, and D2 represents an interval in the circumferential direction between the other end of the protrusion in the circumferential direction and the adhesive placed near the other end of the protrusion, as viewed in the direction of the rotation axis of the rotor, $$(W1-W2)/2<D1 \qquad (2)$$

$$(W1-W2)/2<D2 \qquad (3).$$

4. The method for manufacturing a rotor according to claim 3, wherein
    the protrusion is formed on the inner side surface of the magnet hole on the radially inner side,
    the radially inner side surface of the magnet hole has a pair of tilted surfaces that are tilted from the radially outer side toward the radially inner side of the magnet hole as viewed in the direction of the rotation axis of the rotor,
    the permanent magnet has a pair of outer side surfaces that are tilted so as to conform to the pair of tilted surfaces of the magnet hole, and
    the expressions (2), (3) are satisfied when the permanent magnet has been inserted in the magnet hole and before the adhesive is expanded, where W1 represents a width in the circumferential direction between the pair of tilted surfaces of the magnet hole, and W2 represents a width in the circumferential direction between the pair of outer side surfaces of the permanent magnet at the same radial position, as viewed in the direction of the rotation axis of the rotor.

5. The method for manufacturing a rotor according to claim 4, wherein
    the interval D in the circumferential direction between the end of the protrusion in the circumferential direction and the adhesive is larger than a thickness of the adhesive before expansion of the expanding agent.

6. The method for manufacturing a rotor according to claim 5, wherein
    the expression (1) is satisfied, where D represents the interval in the circumferential direction between a side end of the protrusion in the circumferential direction, which is an inner side surface of the groove in the circumferential direction, and the adhesive.

7. The method for manufacturing a rotor according to claim 4, wherein
    the expression (1) is satisfied, where D represents the interval in the circumferential direction between a side end of the protrusion in the circumferential direction, which is an inner side surface of the groove in the circumferential direction, and the adhesive.

8. The method for manufacturing a rotor according to claim 4, wherein
    the adhesive contains a foaming agent that expands when heated to a temperature equal to or higher than the expansion temperature.

9. The method for manufacturing a rotor according to claim 3, wherein
    the interval D in the circumferential direction between the end of the protrusion in the circumferential direction and the adhesive is larger than a thickness of the adhesive before expansion of the expanding agent.

10. The method for manufacturing a rotor according to claim 9, wherein
    the expression (1) is satisfied, where D represents the interval in the circumferential direction between a side end of the protrusion in the circumferential direction, which is an inner side surface of the groove in the circumferential direction, and the adhesive.

11. The method for manufacturing a rotor according to claim 3, wherein
    the expression (1) is satisfied, where D represents the interval in the circumferential direction between a side end of the protrusion in the circumferential direction, which is an inner side surface of the groove in the circumferential direction, and the adhesive.

12. The method for manufacturing a rotor according to claim 3, wherein
    the adhesive contains a foaming agent that expands when heated to a temperature equal to or higher than the expansion temperature.

13. The method for manufacturing a rotor according to claim 3, wherein
    a depth of the groove recessed toward one of the radially outer side and the radially inner side of the magnet hole is larger than a thickness of the adhesive as viewed in the direction of the rotation axis, in a state where the surface of the permanent magnet on one of the radially outer side or the radially inner side is in contact with the protrusion when the permanent magnet has been inserted in the magnet hole and before the expanding agent of the adhesive is expanded.

14. The method for manufacturing a rotor according to claim 2, wherein
    the interval D in the circumferential direction between the end of the protrusion in the circumferential direction and the adhesive is larger than a thickness of the adhesive before expansion of the expanding agent.

15. The method for manufacturing a rotor according to claim 14, wherein
    the expression (1) is satisfied, where D represents the interval in the circumferential direction between a side end of the protrusion in the circumferential direction, which is an inner side surface of the groove in the circumferential direction, and the adhesive.

16. The method for manufacturing a rotor according to claim 2, wherein
    the expression (1) is satisfied, where D represents the interval in the circumferential direction between a side end of the protrusion in the circumferential direction, which is an inner side surface of the groove in the circumferential direction, and the adhesive.

17. The method for manufacturing a rotor according to claim 2, wherein
    the adhesive contains a foaming agent that expands when heated to a temperature equal to or higher than the expansion temperature.

18. The method for manufacturing a rotor according to claim 2, wherein
    a depth of the groove recessed toward one of the radially outer side and the radially inner side of the magnet hole is larger than a thickness of the adhesive as viewed in the direction of the rotation axis, in a state where the surface of the permanent magnet on one of the radially outer side or the radially inner side is in contact with the protrusion when the permanent magnet has been inserted in the magnet hole and before the expanding agent of the adhesive is expanded.

19. The method for manufacturing a rotor according to claim 1, wherein the adhesive contains a foaming agent that expands when heated to a temperature equal to or higher than the expansion temperature.

20. The method for manufacturing a rotor according to claim 1, wherein a depth of the groove recessed toward one of the radially outer side and the radially inner side of the magnet hole is larger than a thickness of the adhesive as viewed in the direction of the rotation axis, in a state where the surface of the permanent magnet on one of the radially outer side or the radially inner side is in contact with the protrusion when the permanent magnet has been inserted in the magnet hole and before the expanding agent of the adhesive is expanded.

* * * * *